(12) United States Patent
Rubio

(10) Patent No.: US 11,793,359 B2
(45) Date of Patent: Oct. 24, 2023

(54) SCOOP-SPATULA

(71) Applicant: Bruno Alejandro Rubio, Athens, GA (US)

(72) Inventor: Bruno Alejandro Rubio, Athens, GA (US)

( * ) Notice: Subject to any disclaimer, the term of this patent is extended or adjusted under 35 U.S.C. 154(b) by 0 days.

(21) Appl. No.: 17/543,740

(22) Filed: Dec. 7, 2021

(65) Prior Publication Data

US 2023/0172398 A1   Jun. 8, 2023

(51) Int. Cl.
*A47J 43/28* (2006.01)

(52) U.S. Cl.
CPC .................. *A47J 43/288* (2013.01)

(58) Field of Classification Search
CPC .............................. A47J 43/288; A47J 45/10
USPC ........................................ 294/7, 176, 54.5
See application file for complete search history.

(56) References Cited

U.S. PATENT DOCUMENTS

| | | | | |
|---|---|---|---|---|
| 1,362,031 | A * | 12/1920 | Nopp | A47J 43/288 30/136 |
| 2,864,117 | A * | 12/1958 | Williams | A47L 13/52 15/257.3 |
| D269,129 | S * | 5/1983 | Manfre | D30/162 |
| D295,336 | S * | 4/1988 | Kuder | D32/74 |
| D331,686 | S * | 12/1992 | Persson | 294/7 |
| D450,548 | S * | 11/2001 | Veltri | D7/688 |
| D479,105 | S * | 9/2003 | Debord | D8/81 |
| D587,538 | S * | 3/2009 | Vendl | D7/688 |
| D760,988 | S * | 7/2016 | Gieson | D32/74 |
| D916,410 | S * | 4/2021 | Magee | D32/46 |
| 2021/0022558 | A1* | 1/2021 | Han | A47J 43/288 |

* cited by examiner

*Primary Examiner* — Paul T Chin
(74) *Attorney, Agent, or Firm* — Smith Tempel Blaha LLC; Gregory Scott Smith

(57) ABSTRACT

A scoop-spatula that includes an elongated handle, a blade and a transitional connection between the elongated handle and the blade such that the handle is set above the blade. The blade includes a side edge, a rear wall, a front-side wall, a back-side wall and a top working surface that all define a trough on the top-side of the blade that is operable to hold ingredients and juices.

9 Claims, 8 Drawing Sheets

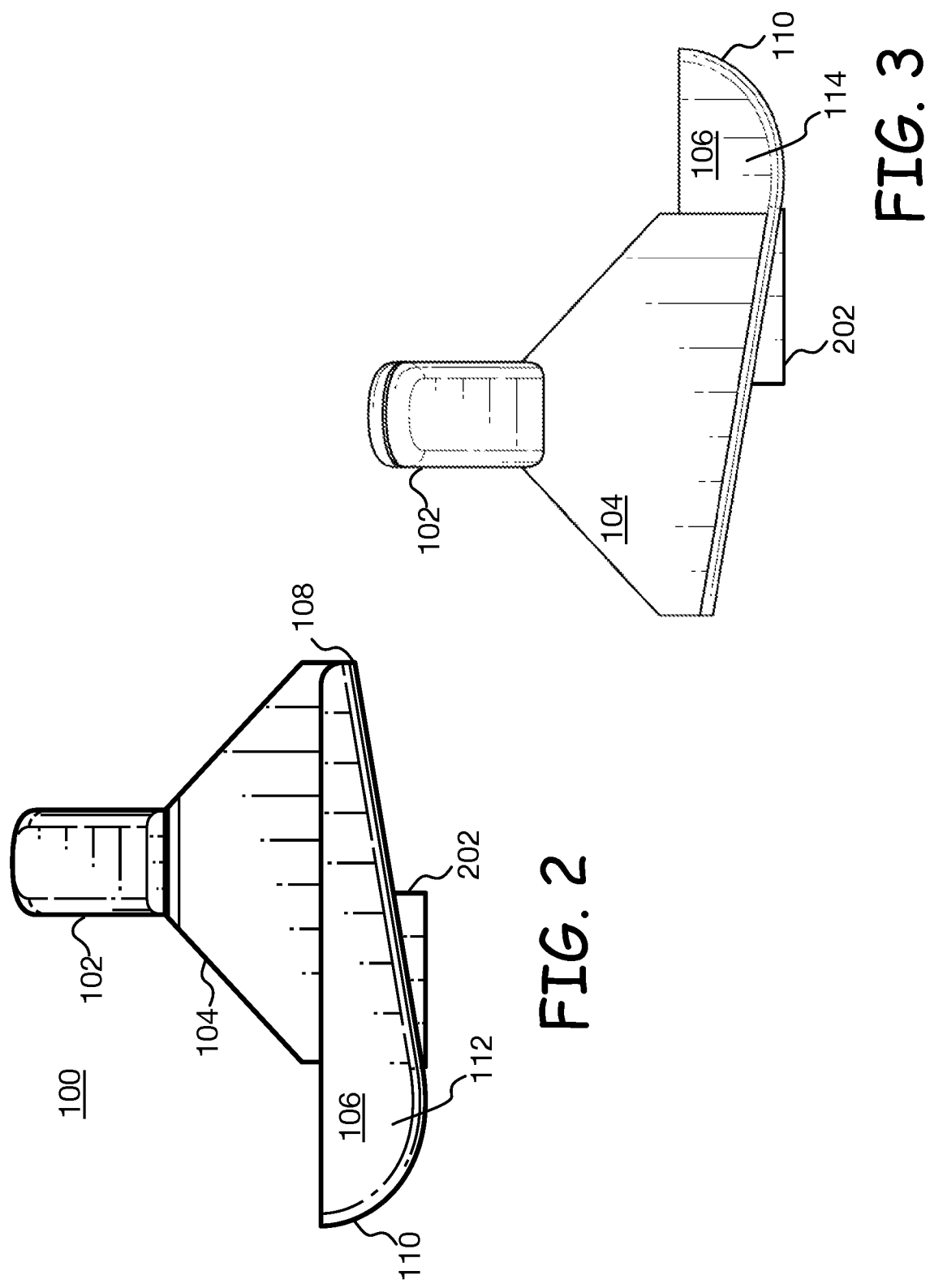

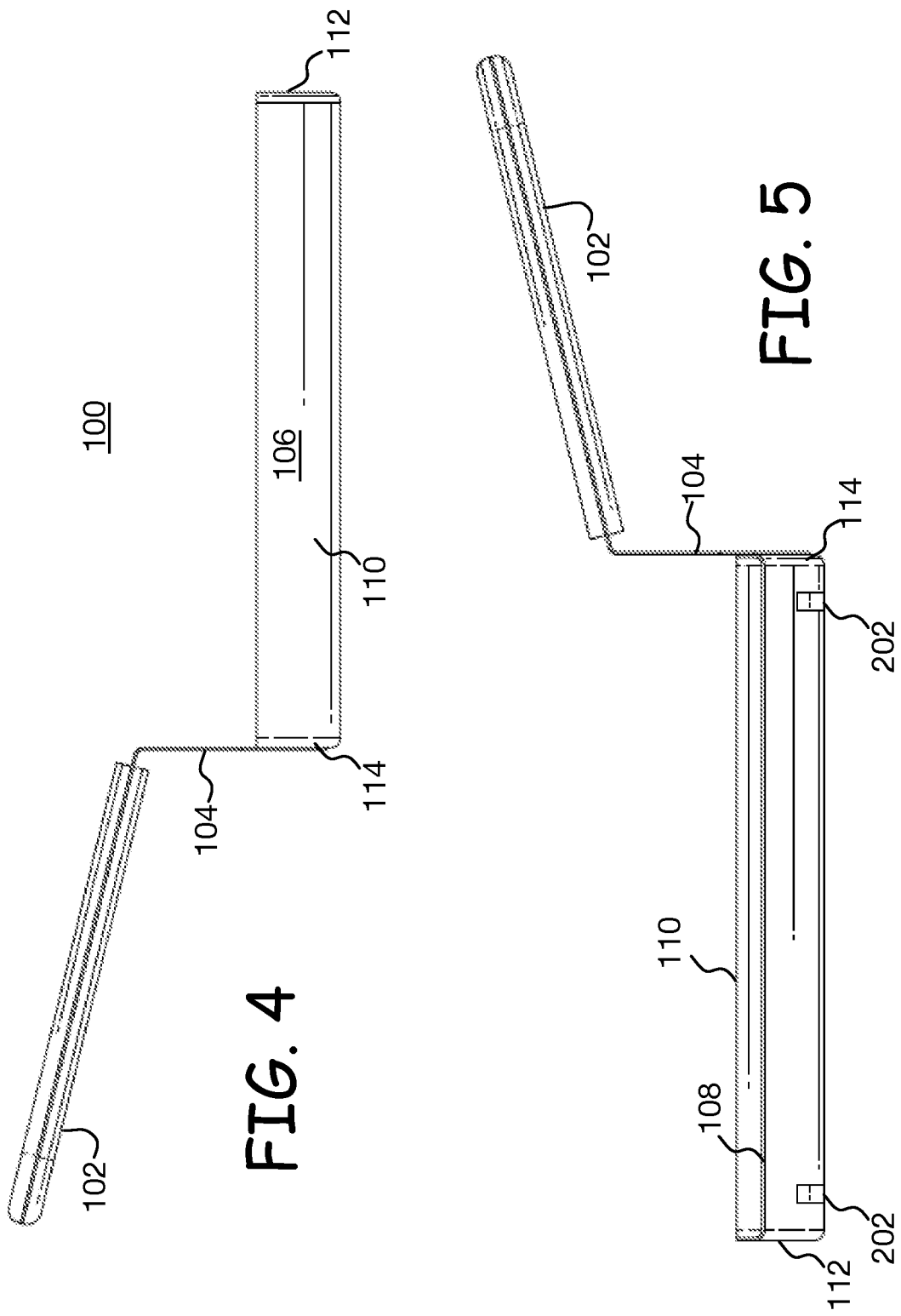

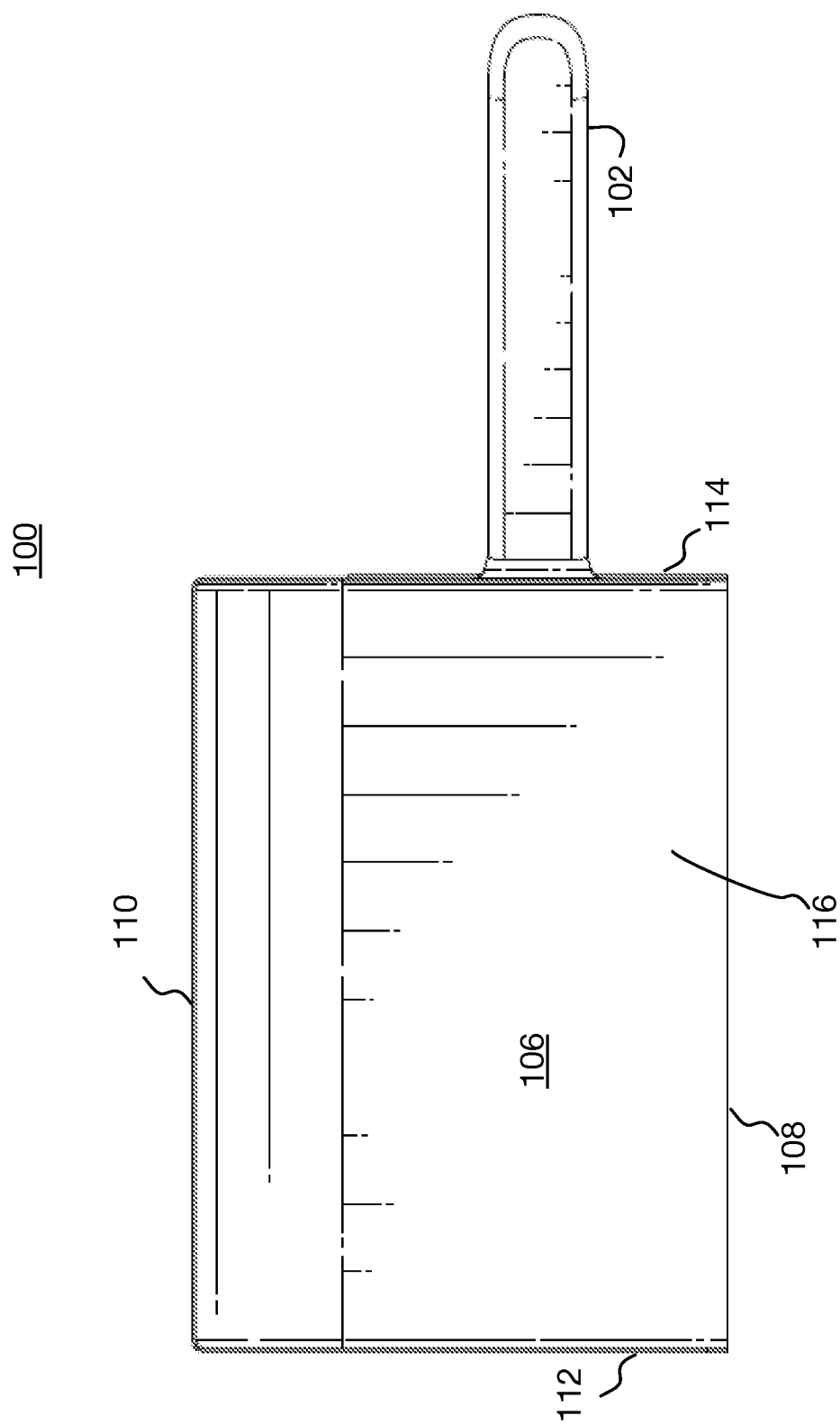

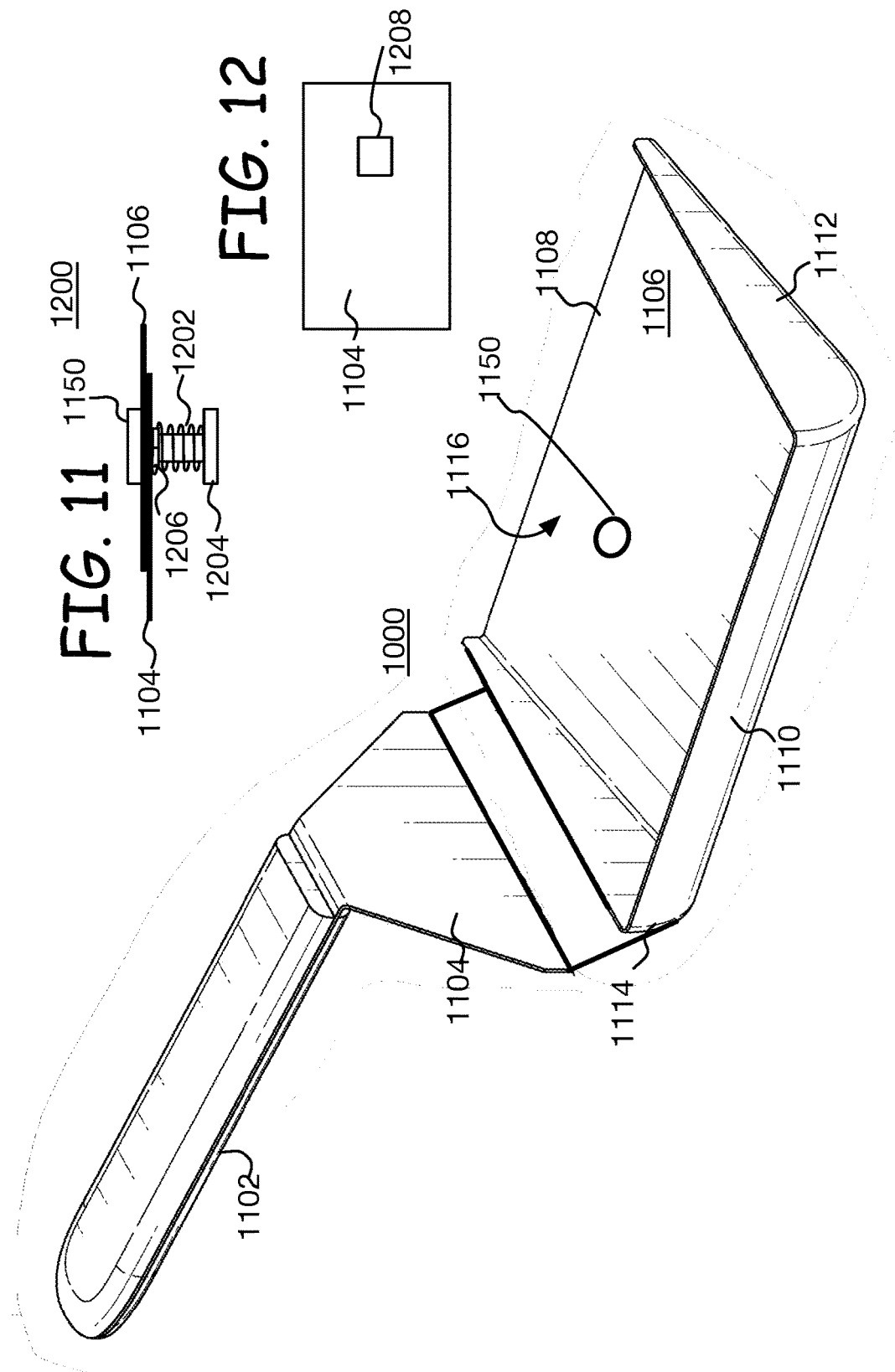

SCOOP-SPATULA

BACKGROUND

"If you can't stand the heat, get out of the kitchen!" The connectivity of the world through the prolific growth, migration and integration of the Internet and social media has had tremendous impact in all facets of life. The technology growth has brought into existence a category of people that refer to themselves as "foodies". While it is not really clear what criteria must be met to officially refer to yourself as a "foodie", it seems that people are quite inclined to make such bodacious claims on their various social media feeds. Merriam-Webster defines foodie as "a person having an avid interest in the latest food fads". So, really, anyone that claims to try something "new", even if it is new to just them, can argue that they are a foodie. However, there is a class of people that are above and beyond the normal consumers of food. These are the types of people that know what type of wine goes well with cabbage, what type of fish is best with what seasoning, how to pair spices and flavors to create edible items that simply erupt in harmonious flavor to one's pallet.

But creating incredible food entrées that raise the eyebrows of the most critical foodies can be a difficult task. Obtaining the freshest, most flavored ingredients, using the perfect blend and amount of spices, fully cooking but not over or under cooking, and finally presentation and pairing with other items and beverages can all be a monumental task. So, it not only takes knowledge, but it also requires skills and even ensuring that one has the best and most applicable equipment.

One problem that many people face is that as you cook an item, the juices seep out of the item, often taking with them valuable spices and flavorings. This is especially true in the context of sautéing or frying on a griddle. For instance, when cooking an item such as a philly cheese steak or Cuban sandwich, the juices can be cooked out of the meat leaving you with a dry, less-flavorable sandwich. It can be difficult to collect such juices and transport it to the sandwich. This is especially true utilizing common, prior art spatulas, which are flat. What is needed in the art is a cooking utensil that would enable a chef or cook to collect such juices and transport them along with the ingredients that are being cooked to a plate or other target.

BRIEF SUMMARY

The various embodiments address the above-identified needs in the art, as well as other needs by providing a scoop-spatula that includes an elongated handle, a blade and a transitional connection between the elongated handle and the blade such that the handle is set above the blade. The blade includes a side edge, a rear wall, a front-side wall, a back-side wall and a top working surface that all define a trough on the top-side of the blade that is operable to hold ingredients and juices.

The blade includes one or more footers associated with a bottom surface of the blade. The one or more footers are configured to hold the edge of the blade above the working surface of the blade, whereby items located within the trough are retained within the trough when the cooking utensil apparatus is resting on the one or more footers. In some embodiments, the rear wall curves upward and backwards from the top working surface of the blade. In some embodiments, the side edge is configured to be sharpened for cutting or chopping. In some embodiments, the side edge is serrated.

In some embodiments, the transitional connection is associated with the back-side wall such that the side edge of the blade is oriented towards the left of the handle and the rear wall is oriented towards the right thus being a right-handed tool. In other embodiments it is associated with the front-side wall thus being a left-handed tool. Further, in some embodiments it can be adjusted between two or more positions.

BRIEF DESCRIPTION OF THE SEVERAL VIEWS OF THE DRAWING

FIG. 2 is a front-end view of the embodiment of the scoop-spatula illustrated in FIG. 1.

FIG. 3 is a back-end view of the embodiment of the scoop-spatula illustrated in FIG. 1.

FIG. 4 is a rear side-elevation view of the scoop-spatula.

FIG. 5 is a blade-front side-elevation view of the scoop-spatula.

FIG. 6 is a top plan view of the scoop-spatula of FIG. 1.

FIG. 10 illustrates an alternative embodiment of the scoop-spatula with a rotatably adjustable handle 1102 and transactional connection 1104.

FIG. 11 is a side view showing the operation of the spring pressure rotatable pin 1200.

FIG. 12 is a top plan view of the transactional connector 1104 that extends under the blade 1106.

DETAILED DESCRIPTION OF VARIOUS EMBODIMENTS

The present invention, as well as features and aspects thereof, is directed towards providing a cooking utensil and more particularly, a spatula that is structured such that it can be used for cooking ingredients and to scoop up the ingredients together with juices and seasoning for delivery to a plate or other landing.

Turning now to the drawings in which like elements are referenced by like numbers throughout the several views, various embodiments, features, aspects, characteristics, operations, etc., of the present invention are presented. It should be appreciated that no all variations of the invention are presented herein and the scope of the invention can be expanded to cover other embodiments and/or implementations of the principles presented within this description. Further, the presented embodiments are not intended for production but rather to convey the features, aspects, characteristics, operations, etc., of the various embodiments.

Figure 1:
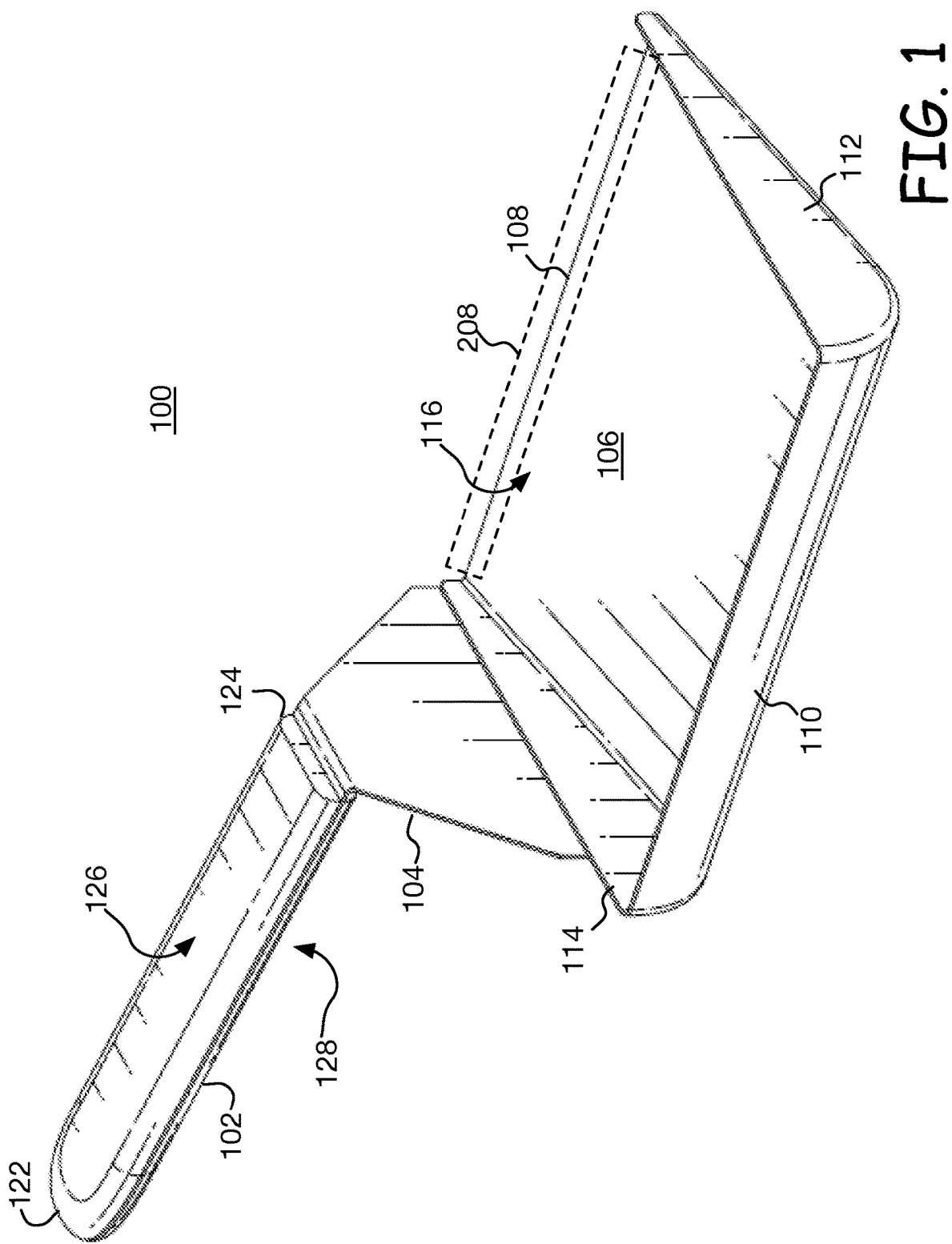
FIG. 1 is a perspective view of an embodiment of the scoop-spatula.

FIG. 1 is a perspective view of an embodiment of the scoop-spatula. The scoop-spatula 100 includes a handle 102, a blade 106 and a transitional connector 104 connecting the handle 102 to the blade 106. The handle 102 includes a proximate end 122 and a distal end 124. The distal end 124 is connected to or integral with the transitional connector 104. It should be appreciated that the handle 102 and the transitional connector 104 may be one continuous element. As illustrated in FIG. 1, the transitional connector 104 extends the length of the handle 102 and is sandwiched between handle grip upper 126 and handle grip lower 128.

The blade 106 includes an edge 108, a substantially flat working surface 116, a rear wall 110, a front-side wall 112 and a back-side wall 114. The transitional connector 104 attaches to or is integral with the back-side wall 114. It should be appreciated that the blade 106, transitional connector 104 and handle 102 may all be manufactured as a single unit, such as being poured in a mold or pressed from a single sheet of metal or other material, or include two or more pieces that are connected together using a variety of techniques such as welding, adhesive, rivets, bolts, tabs, etc.

In the illustrated embodiment, the transitional connector 104 enables the handle 102 to be above, or along a higher plane than the blade. This advantageously allows a user to grip the handle 102 with some distance between the user's hand and the heat from the cooking surface. In the illustrated embodiment, the handle 102 is shown as extending away from the blade 106. In some embodiments, it should be appreciated that the transitional connector 104 can cause the handle 102 to be at a higher or lower plane than what is illustrated. In some embodiments, the handle 102 may extend over the surface of the blade 106 and in some embodiments, the handle 102 maybe connected on one end to the back-side wall 114 and on the other end to the front-side wall 112. In other embodiments, the transitional connector 104 may be associated with the rear wall 110 and the handle may extend away from the blade 106 from the rear wall 110 thus creating a shovel-like appearance. In some embodiments, the transitional connector 104 maybe rotatably mounted to the bottom surface of the blade 106 such that the handle 102 and the transitional connector 104 may be rotated from the position illustrated in FIG. 1 (in which it is a right-handed tool), to the position where the handle 102 extends from the rear wall 110 and then to the position where the handle extends from front-side wall 112 (thus making it a left-handed tool).

In some embodiments, the transitional connector 104 may extend above and to the sides of the handle 102 to provide a splash guard against grease and/or juice splattering or heat transfer.

Figure 7:
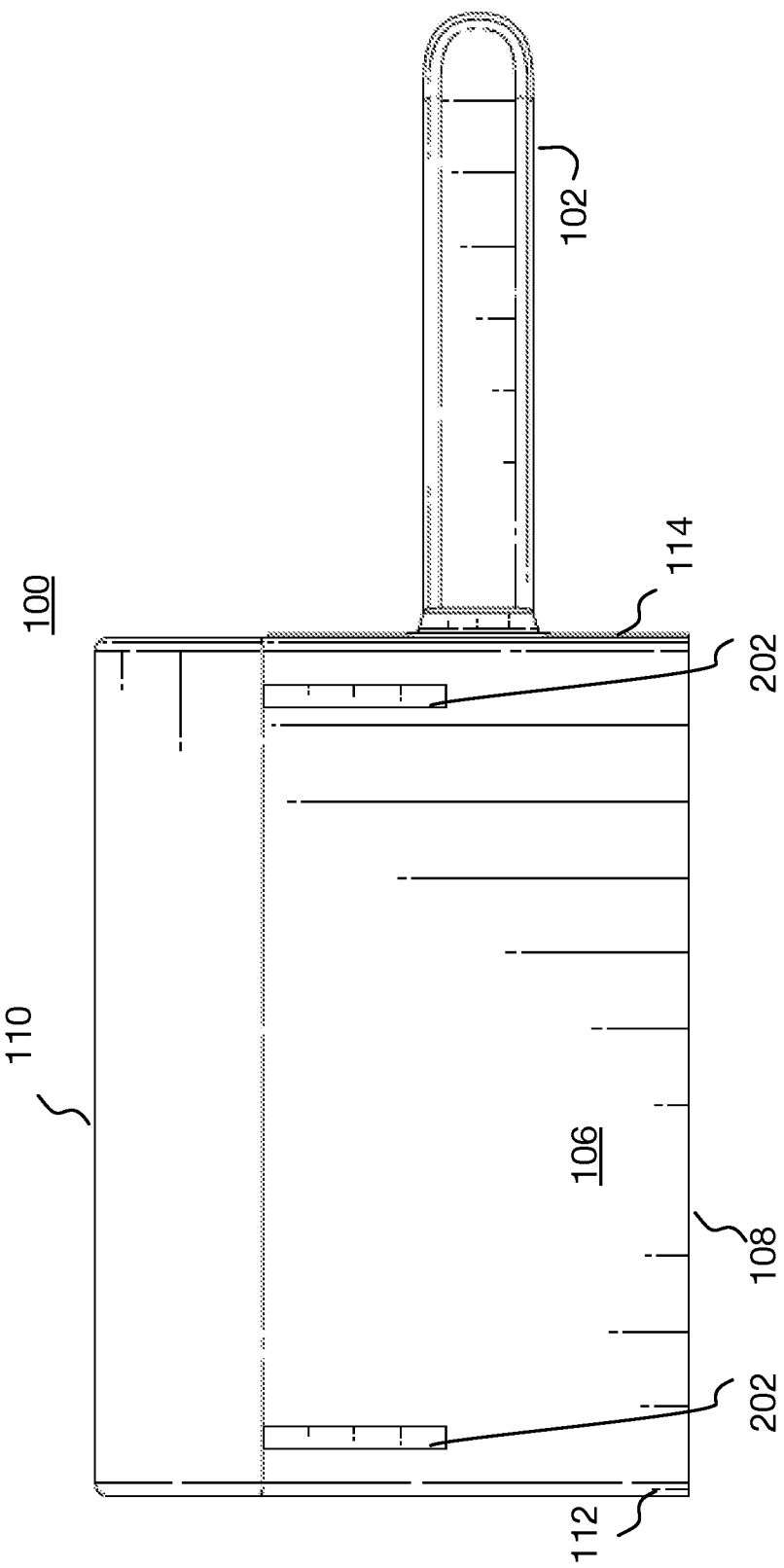
FIG. 7 is a bottom plan view of the scoop-spatula of FIG. 1.

FIG. 2 is a front-end view of the embodiment of the scoop-spatula illustrated in FIG. 1. From FIG. 2, it can be seen that the underside of the blade 106 includes a footer 202. The footer 202 allows the coop-spatula 100 to be set on a surface, such as the flat surface of a table, counter, grill, etc. The length of the footer 202 is sufficient to allow the scoop-spatula to rest in place with the bottom surface of the footer 202 maintaining the scoop-spatula 100 in a stable position. It can be seen from FIG. 2, that in the illustrated embodiment, when the scoop-spatula is resting on the footer 202 (actually two or more footers are employed as best seen in FIG. 5 and FIG. 7), the top flat working surface 116 of the blade 106 is at an angle such that the top surface angles downward from the edge 108 of the blade 106. In addition, the scoop-spatula also rests on the bottom surface of the blade 106 proximate to the rear wall 110.

Advantageously, this aspect of this embodiment allows the ingredients and/or liquid/juices to be held and contained within the blade 106 within a trough created by the flat working surface 116, the rear wall 110, the front-side wall 112 and the back-side wall 114.

FIG. 3 is a back-end view of the embodiment of the scoop-spatula illustrated in FIG. 1. From FIG. 3, another footer 202 can be viewed proximate to the back-side wall 114.

FIG. 4 is a rear side-elevation view of the scoop-spatula. From this view, the rear wall 110 is viewed. FIG. 5 is a blade-front side-elevation view of the scoop-spatula. In this view, the edge 108 of the blade 106 can be seen with the inside surface of the rear wall 110 in the background. In addition, two footers 202 can be seen as coinciding with the under-side surface of the blade 106.

FIG. 6 is a top plan view of the scoop-spatula of FIG. 1. From this angle, the trough formed by the working surface 116, the rear wall 110, the front-side wall 112 and the back-side wall 114 is visible.

FIG. 7 is a bottom plan view of the scoop-spatula of FIG. 1. From this angle, the bottom side of the blade 106 is visible showing two footers 202.

Figure 8:
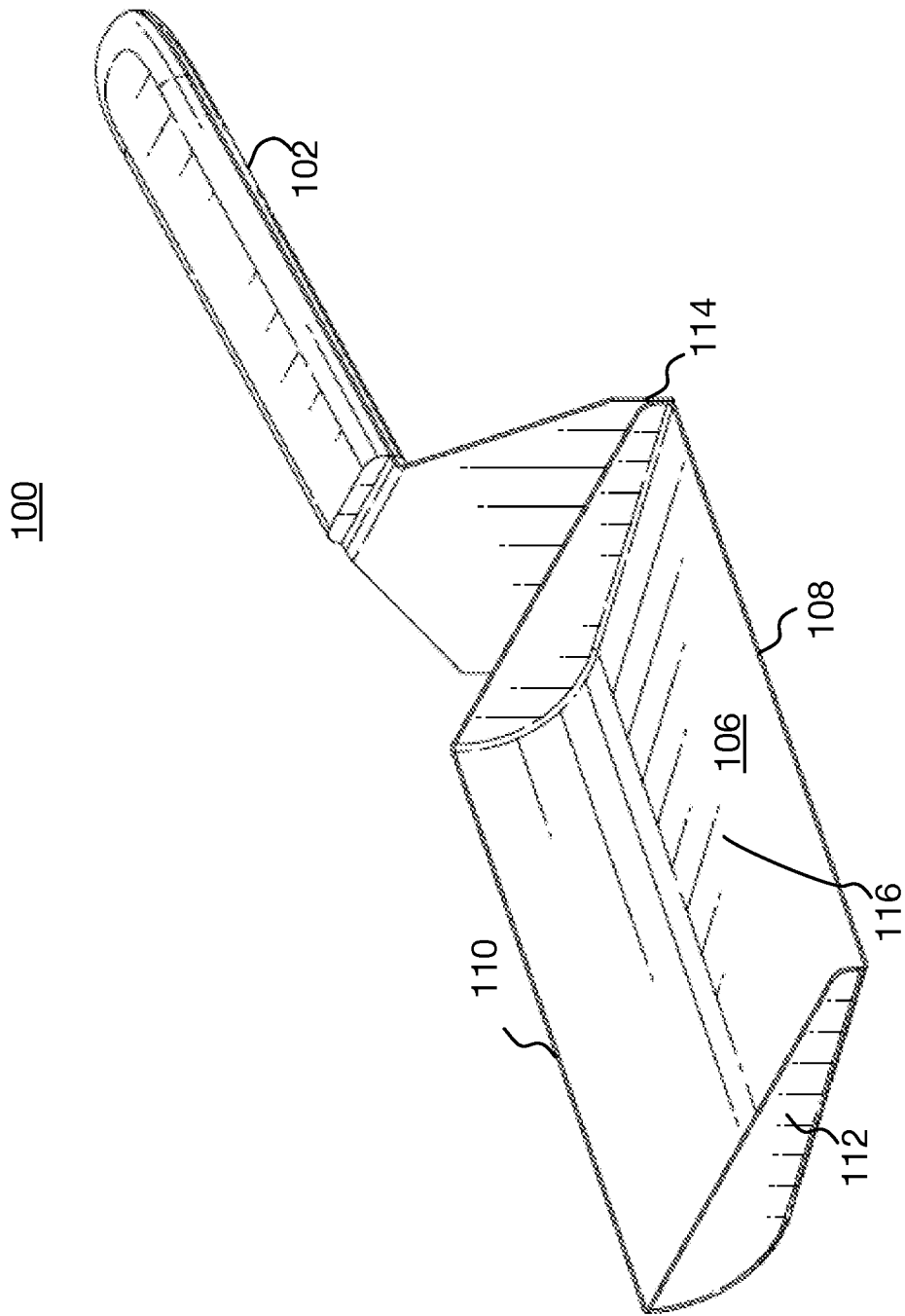
FIG. 8 is a perspective view of the scoop-spatula of FIG. 1 illustrating the trough formed by the rear wall 110, front-side wall 112, back-side wall 114 and working surface 116.

FIG. 8 is a perspective view of the scoop-spatula of FIG. 1 illustrating the trough formed by the rear wall 110, front-side wall 112, back-side wall 114 and working surface 116.

In operation, the embodiment illustrated in FIGS. 1-8, as well as variants thereof, is suitable for use in cooking, frying and grilling, as well as other operations including sauteing, stir fry, etc. Items on the cooking surface can be moved around using the front-side wall 112 and/or the edge 108 of the blade 106. Further, with the handle 102 in hand, a user can tilt the blade 106 such that the edge 108 is flush with the cooking surface and items can be scooped up in the blade 106, tossed around within the trough of the blade 106 and then poured back onto the cooking surface. Further, the edge 108 of the blade 106 can be used for chopping, dicing or cutting the items that are being cooked. As such, the edge 108 can be configured to be sharpened, similar to a knife, to enable it to cut or chop better. In some embodiments, the edge 108 may be serrated 208.

The trough created by the rear wall 110, front-side wall 112, back-side wall 114 and the inside surface 116 of the blade 106 is configured to have a depth that is sufficient for holding ingredients that are being cooked as well as juices or liquids that the ingredients are being cooked in or that are cooked out of the ingredients. The trough allows the scoop-spatula 100 to operate as a scoop. Thus, a user can lower the edge 108 of the blade 106 and slide it across the cooking surface thereby picking up or scooping up the ingredients being cooked and any juices or liquids associated with the ingredients. The user can then use the scoop-spatula to transport the ingredients and the juices to a new location, such as a plate, open faced bread, or on other landing areas such as the top of a steak or fish fillet etc.

The bottom side of the blade 106 can be utilized for flattening or applying pressure to items that are being cooked.

The edge 108 and the rear wall 110 of the blade 106 can be oriented such that the scoop-spatula is left-handed or right-handed. For instance, if the edge 108 is on the left side of the blade 106 relative to the view from the handle 102, then this would be a right-handed embodiment. Likewise, if the edge 108 is on the right side of the blade 106 relative to the view from the handle 102, then this would be a left-handed embodiment. It should be appreciated that a user can employ the use of a left-handed and right-handed embodiment at the same time to enable the user to scoop up even larger portions of the ingredients and juices.

Figure 9:
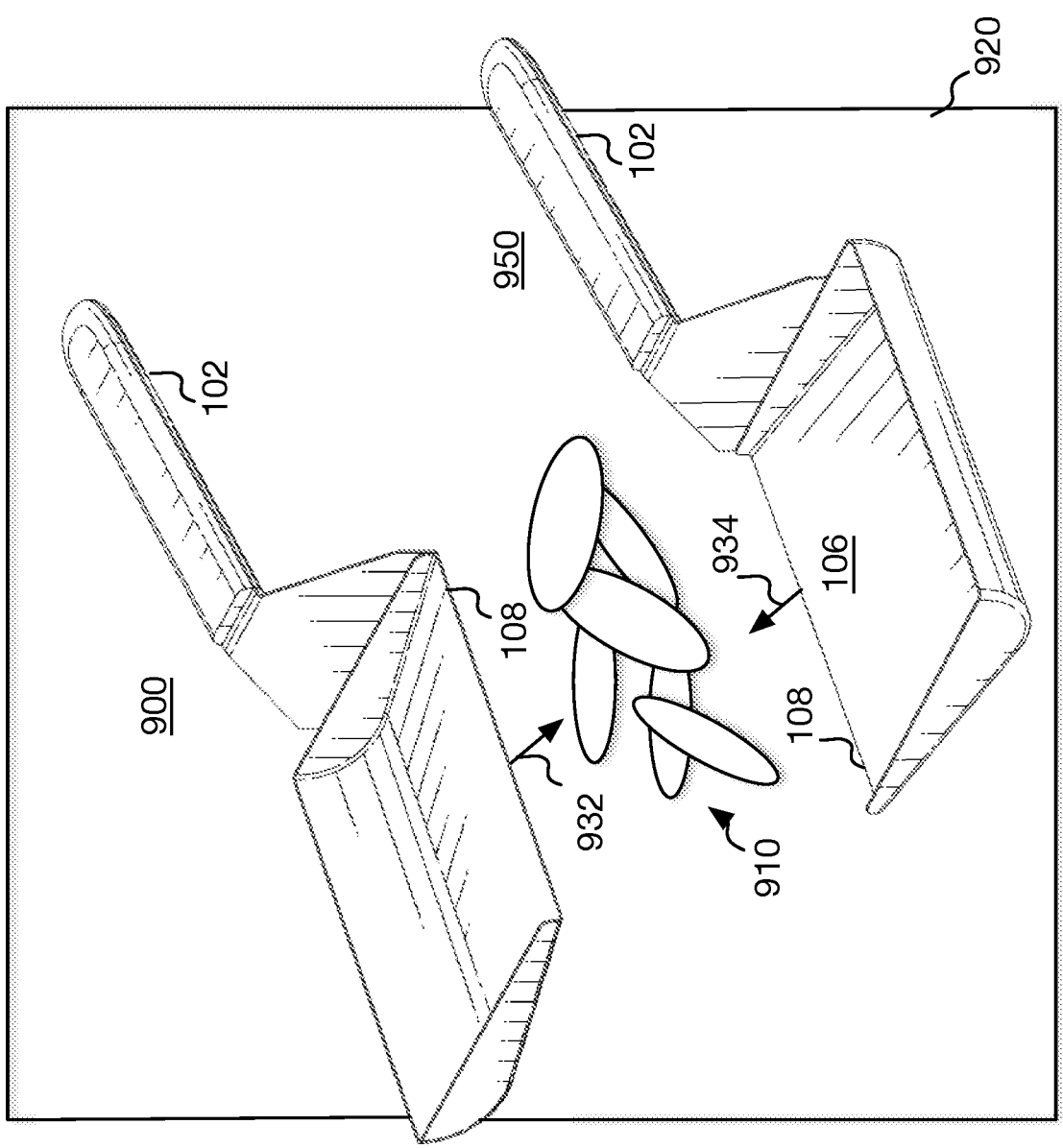
FIG. 9 illustrates the use of a left-handed and right-handed scoop-spatula together.

FIG. 9 illustrates the use of a left-handed and right-handed scoop-spatula together. The right-handed scoop-spatula 900 is illustrated as being used in conjunction with the left-handed scoop-spatula 950 to cook ingredients 910 on cooking surface 920. Thus, the user can push the edges 108 of blades 106 together in the directions of arrow 932 and 934 respectively. This advantageously enables the user to scoop up the ingredients 910 and either agitate them for cooking or transport them to a target location along with any juices or liquids associated with the ingredients.

FIG. 10 illustrates an alternative embodiment of the scoop-spatula with a rotatably adjustable handle 1102 and transactional connection 1104. In the illustrated embodiment, the transactional connection 1104 extends under the blade 1106 and is secured to the blade 1106 with a spring pressure rotatable pin 1200 (see FIG. 11). FIG. 11 is a side view showing the operation of the spring pressure rotatable pin 1200. The transactional connector 1104 extends under the blade 1106. The spring pressure rotatable pein 1200 extends up through the transactional connector 1104 and is secured to the bottom of the blade 1106 or, it may extend through the blade 1106 and be secured to the top of the blade 1106 (see element 1150). The top portion of the spring pressure rotatable pin 1206 includes edges, such as being square, whereas the lower portion has a smaller diameter and is rounded. FIG. 12 is a top plan view of the transactional connector 1104 that extends under the blade 1106. In operation, the transactional connector can be forced down against the spring 1202 such that the square opening 1208 of the transactional connector 1104 can be slid down from the top portion of the spring pressure rotatable pin 1206, where the edges mate with the shape of the square opening or other shaped aperture 1208, down to the smaller and rounded portion of the spring pressure rotatable pin 1200 where the transactional connector 1104 can freely rotate. The transactional connector 1104 can then be rotated to a different position and the pressure can be released thus forcing the aperture 1208 over the upper part of the spring pressure rotatable pin 1206 such that it is locked into position. It can be appreciated that a square shaped aperture and upper spring pressure rotatable pin 1206 allows an adjustment between 4 positions. A triangular shape would allow three positions, etc. The illustrated embodiment thus enables the handle 1102 to be switched between various positions such that the handle 1102 is oriented at different positions relative to the blade 1106. Thus, the trough formed by the edge 1108, rear side 1110, front-side wall 1112, back-side wall 1114 and working surface 1116 can be oriented as a left-handed tool, right-handed tool or in a shovel type configuration by adjusting the handle 1102 position. The spring pressure rotatable pin 1206 is preferably small enough such that it does not extend pass the surface of the footers.

While the invention has been illustrated primarily in view of the FIG. 1 embodiments, it will be appreciated that many variations can be made without departing from the spirit and scope of the present invention. For instance, the rear wall 110 has been illustrated as being curved. In some embodiments, the rear wall may be orthogonal to the working surface 116 of the blade 106. In other embodiments, the rear wall may be at an angle relative to the working surface 116 such that the trough is still created.

In some embodiments, the edge 108 can be sharpened to facilitate cutting of items or chopping during cooking. Likewise, the upper edge of the rear wall 110 may also be sharpened and used to cutting or chopping.

In some embodiments, the front side wall may be eliminated. In such embodiments, the trough may be formed by the rear wall 110, back-side wall 114 and the working surface 116. Further, in such embodiments, the footers 202 may be configures such that when the scoop-spatula is laid down, the working surface 116 angles toward the rear wall 110 and the back-side wall 114.

In some embodiments, the handle 202 and transitional connector 104 are detachable from the blade 106. Further, the handle 202 and transition connector 104 may be attachable to the back-side wall 114 and/or the front-side wall 112. By being attachable to both interchangeably, the scoop-spatula can be easily converted from a right-handed to a left-handed orientation.

The various embodiments of the scoop-spatula can be fabricated from various materials. Typically, the scoop-spatula is fabricated from metal, such as stainless steel, aluminum, cast iron, etc. However, in some embodiments the scoop-spatula may be manufactured from wood, a silicone or plastic material suitable cooking. In other embodiments, the scoop-spatula may include a rigid core, such as wood, metal or hard plastic, and then a soft malleable outer shell, such as silicone.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A cooking utensil apparatus comprising:
    an elongated handle;
    a blade;
    a transitional connection between the elongated handle and the blade such that the handle is elevated relative to the blade; and
    wherein the blade includes a side edge, a rear wall, a front-side wall, a back-side wall and a top working surface that all define a trough on the top-side of the blade that is operable to hold ingredients and juices, wherein the rear wall arches upwards from the top-side of the blade and wherein the elongated handle is attached to the front-side wall or back-side wall and extends away from the blade.

2. The cooking utensil apparatus of claim 1, wherein the blade includes one or more footers associated with a bottom surface of the blade.

3. The cooking utensil apparatus of claim 2, wherein the one or more footers are configured to hold the edge of the blade above the working surface of the blade, whereby items located within the trough are retained within the trough when the cooking utensil apparatus is resting on the one or more footers.

4. The cooking utensil apparatus of claim 3, wherein the rear wall curves upward and backwards from the top working surface of the blade.

5. The cooking utensil apparatus of claim 4, wherein the side edge is configured to be sharpened for cutting or chopping.

6. A cooking utensil apparatus comprising:
an elongated handle;
a blade;
a transitional connection between the elongated handle and the blade such that the handle is set above the blade;
wherein the blade includes a side edge, a rear wall, a front-side wall, a back-side wall and a top working surface that all define a trough on the top-side of the blade that is operable to hold ingredients and juices and, wherein the transitional connection is associated with the back-side wall such that the side edge of the blade is oriented towards the left of the handle and the rear wall is oriented towards the right thus being a right-handed tool.

7. A cooking utensil apparatus comprising:
an elongated handle;
a blade;
a transitional connection between the elongated handle and the blade such that the handle is set above the blade;
wherein the blade includes a side edge, a rear wall, a front-side wall, a back-side wall and a top working surface that all define a trough on the top-side of the blade that is operable to hold ingredients and juices, and wherein the transitional connection can be removably associated with the back-side wall such that the side edge of the blade is oriented towards the left of the handle and the rear wall is oriented towards the right thus being a right-handed tool and removably associated with the front-side wall such that the side edge of the blade is oriented towards the right of the handle and the rear wall is oriented towards the left thus being a left-handed tool.

8. The cooking utensil apparatus of claim 7, wherein the blade includes one or more footers associated with a bottom surface of the blade.

9. The cooking utensil apparatus of claim 8, wherein the one or more footers are configured to hold the edge of the blade above the working surface of the blade, whereby items located within the trough are retained within the trough when the cooking utensil apparatus is resting on the one or more footers.

* * * * *